(12) United States Patent
Wang

(10) Patent No.: US 12,386,081 B2
(45) Date of Patent: Aug. 12, 2025

(54) FAST SENSOR INITIALIZATION

(71) Applicant: QUALCOMM Incorporated, San Diego, CA (US)

(72) Inventor: Min Wang, Tustin, CA (US)

(73) Assignee: QUALCOMM Incorporated, San Diego, CA (US)

(*) Notice: Subject to any disclaimer, the term of this patent is extended or adjusted under 35 U.S.C. 154(b) by 480 days.

(21) Appl. No.: 17/933,456

(22) Filed: Sep. 19, 2022

(65) Prior Publication Data

US 2024/0094412 A1  Mar. 21, 2024

(51) Int. Cl.
*G01S 19/43* (2010.01)
*G01S 19/26* (2010.01)

(52) U.S. Cl.
CPC .............. *G01S 19/43* (2013.01); *G01S 19/26* (2013.01)

(58) Field of Classification Search
CPC .......... G01S 19/47; G01S 19/45; G01S 19/48; G01S 19/43; G01S 19/26
See application file for complete search history.

(56) References Cited

U.S. PATENT DOCUMENTS

| | | | |
|---|---|---|---|
| 10,670,734 B2 | 6/2020 | Glocker et al. | |
| 12,196,557 B2* | 1/2025 | Bobye | G01C 21/165 |
| 2004/0150557 A1* | 8/2004 | Ford | G01C 21/188 |
| | | | 342/357.32 |
| 2006/0258369 A1* | 11/2006 | Burroughs | G01S 5/0205 |
| | | | 455/12.1 |
| 2007/0004429 A1* | 1/2007 | Edge | H04W 8/08 |
| | | | 455/456.1 |
| 2007/0159385 A1* | 7/2007 | Lawrence | G01S 19/53 |
| | | | 342/357.36 |
| 2011/0210889 A1* | 9/2011 | Dai | G01S 19/235 |
| | | | 342/357.29 |
| 2012/0191345 A1* | 7/2012 | Roh | G01S 19/47 |
| | | | 701/472 |
| 2013/0268192 A1* | 10/2013 | Roh | G01S 19/47 |
| | | | 701/509 |
| 2017/0010363 A1* | 1/2017 | Friend | E02F 9/2054 |
| 2021/0067896 A1* | 3/2021 | Anagnos | H04R 3/00 |
| 2023/0196912 A1* | 6/2023 | Hickman | G01C 15/002 |
| 2024/0067184 A1* | 2/2024 | Palella | G01S 19/49 |

OTHER PUBLICATIONS

International Search Report and Written Opinion—PCT/US2023/029355—ISA/EPO—Nov. 24, 2023.

* cited by examiner

*Primary Examiner* — Dung Hong
(74) *Attorney, Agent, or Firm* — Procopio, Cory, Hargreaves & Savitch LLP/Qualcomm

(57) ABSTRACT

Aspects presented herein may enable a UE to reduce sensor initialization time for one or more sensors that are to be used for DR positioning during a GNSS signal outage. In one aspect, a UE initiates a first positioning engine based on an availability of a GNSS signal, where the first positioning engine measures a relative position of the UE without ambiguity processing. The UE calibrates at least one IMU sensor based on the relative position of the UE measured by the first positioning engine. The UE performs a positioning calculation of the UE via the at least one IMU sensor in response to the GNSS signal being unavailable.

24 Claims, 14 Drawing Sheets

FAST SENSOR INITIALIZATION

TECHNICAL FIELD

The present disclosure relates generally to communication systems, and more particularly, to a wireless communication involving user equipment (UE) positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus initiates a first positioning engine based on an availability of a global navigation satellite system (GNSS) signal, where the first positioning engine measures a relative position of the UE without ambiguity processing. The apparatus calibrates at least one inertial measurement unit (IMU) sensor based on the relative position of the user equipment (UE) measured by the first positioning engine. The apparatus performs a positioning calculation of the UE via the at least one IMU sensor in response to the GNSS signal being unavailable.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
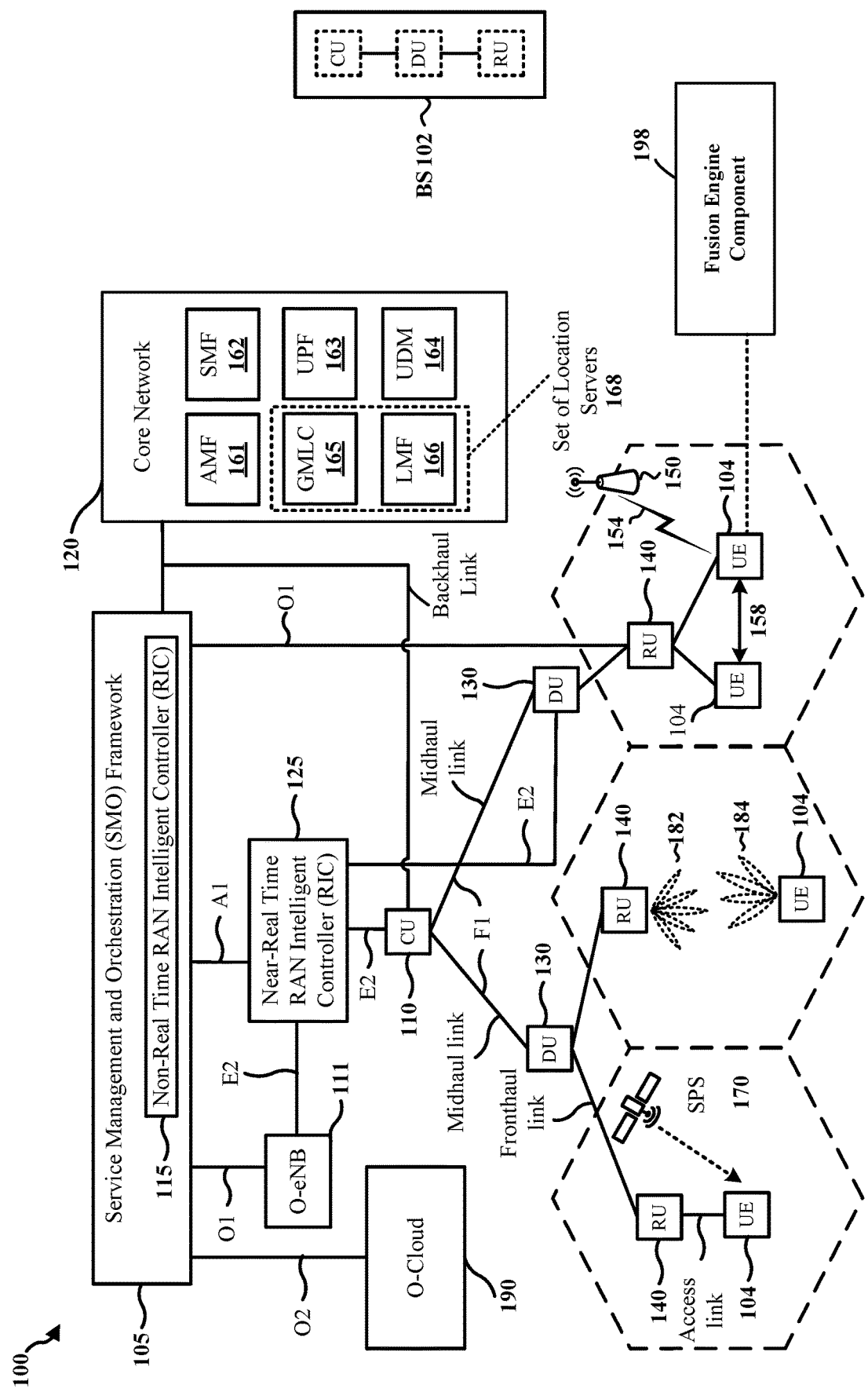
FIG. 1 is a diagram illustrating an example of a wireless communications system and an access network.

Aspects presented herein may improve the latency and accuracy of UE positioning during a GNSS signal outage (e.g., when GNSS signals are available or below a signal threshold) by reducing the sensor initialization time for one or more sensors that are to be used during the GNSS signal outage. Aspects presented herein may enable a fusion engine associated with a positioning engine (e.g., a PPE or an enhanced PPE) to receive positioning output from a second engine (e.g., a relative positioning engine) instead of an RTK engine, where the second engine may be configured to just measure delta carrier phase in an open sky session. For example, position outputs from the second engine may be used for DR position injection right away for the fusion engine, such that the fusion engine or the IMU sensors may not be specified to wait for the RTK engine to converge. As the relative position accuracy from this second engine may also be better than the RTK engine after convergence, the estimation accuracy of the DR related Kalman filter (KF) states may also be improved.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to initiate a first positioning engine based on an availability of a GNSS signal, where the first positioning engine measures a relative position of the UE without ambiguity processing; calibrate at least one IMU sensor based on the relative position of the UE measured by the first positioning engine; and perform a positioning calculation of the UE via the at least one IMU sensor in response to the GNSS signal being unavailable (e.g., via the fusion engine component 198).

Figure 2:
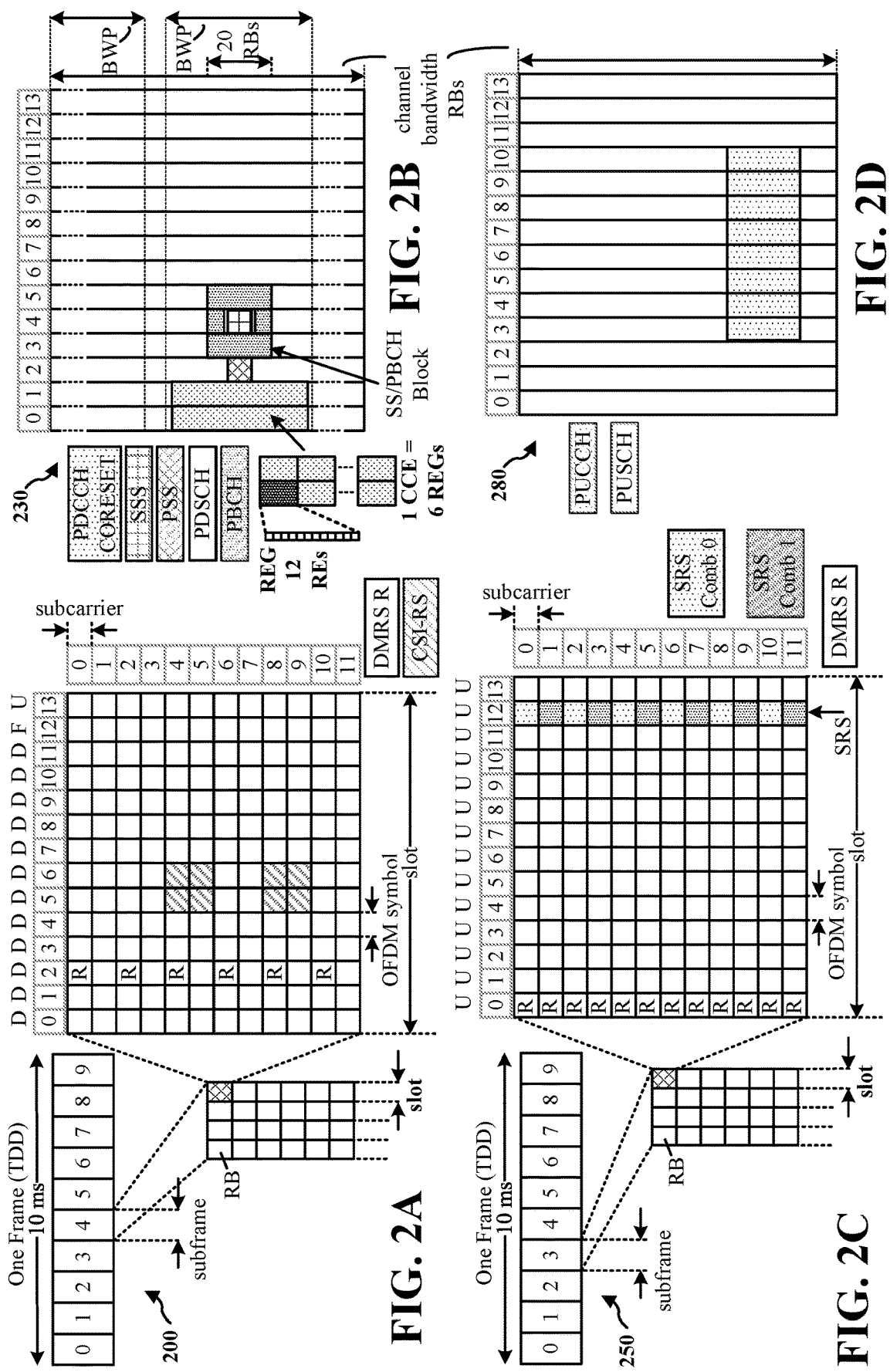
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS

TABLE 1

Numerology, SCS, and CP

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
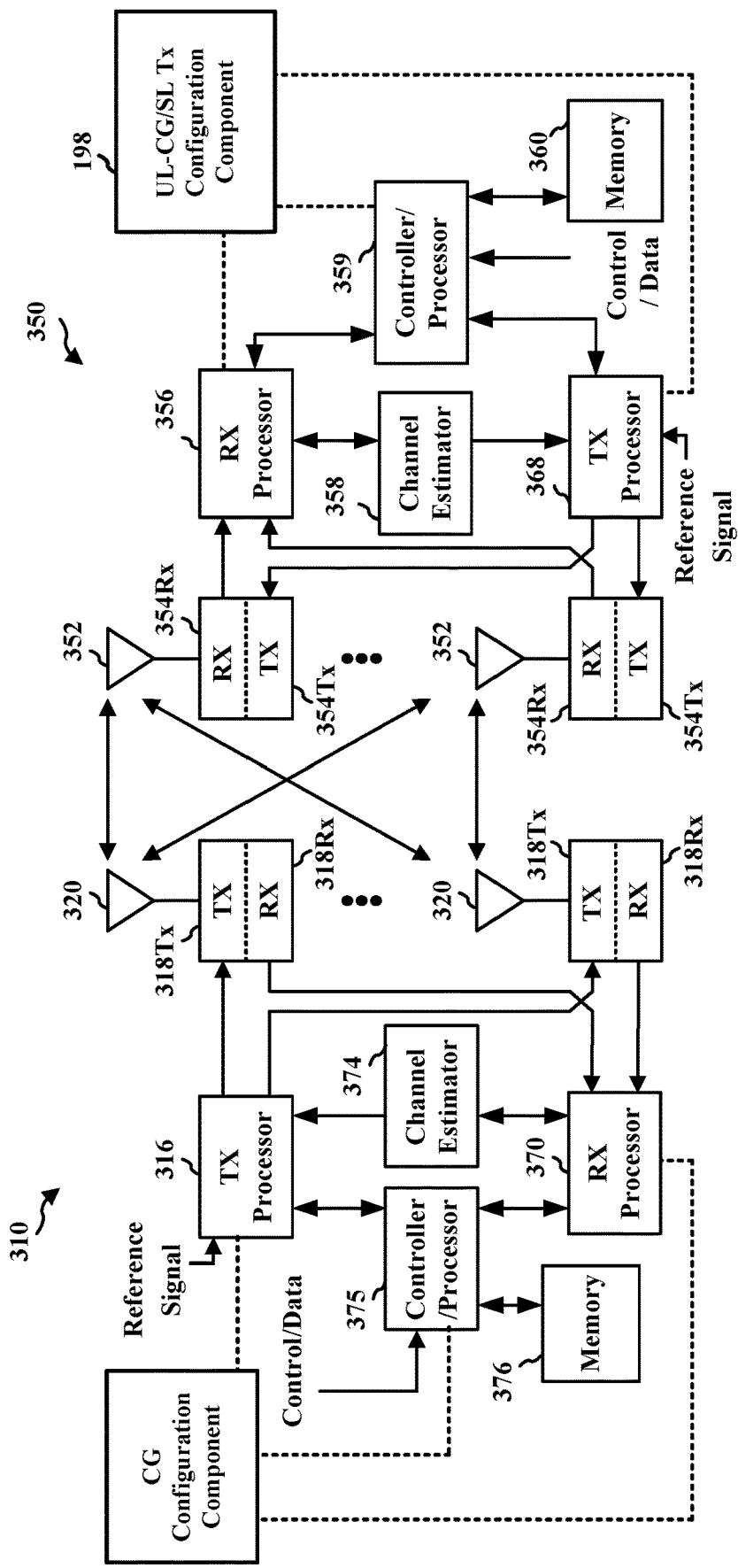
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TB s, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the fusion engine component 198 of FIG. 1.

Figure 4:
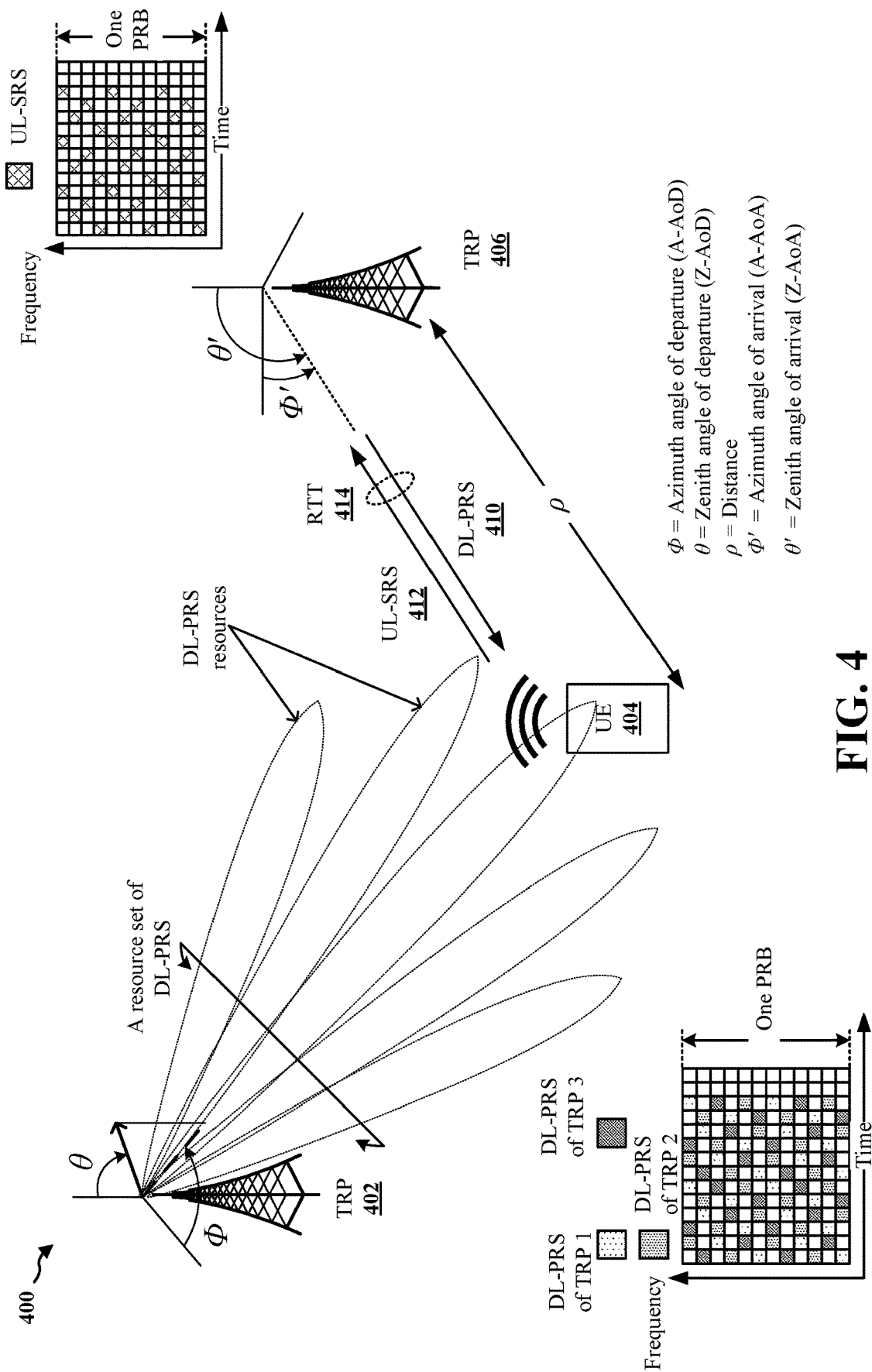
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

A device (e.g., a UE) equipped with a global navigation satellite system (GNSS) receiver (which may include the Global Positioning System (GPS) receiver) may determine its location based on GNSS positioning. GNSS is a network of satellites broadcasting timing and orbital information used for navigation and positioning measurements. GNSS may include multiple groups of satellites, known as constellations, that broadcast signals (which may be referred to as GNSS signals) to control stations and users of the GNSS. Based on the broadcast signals, the users may be able to determine their locations (e.g., via trilateration process). For purposes of the present disclosure, a device (e.g., a UE) that is equipped with a GNSS receiver or is capable of receiving GNSS signals may be referred to as a GNSS device, and a device that is capable of transmitting GNSS signals, such as a satellite, may be referred to as a space vehicle (SV).

Figure 5:
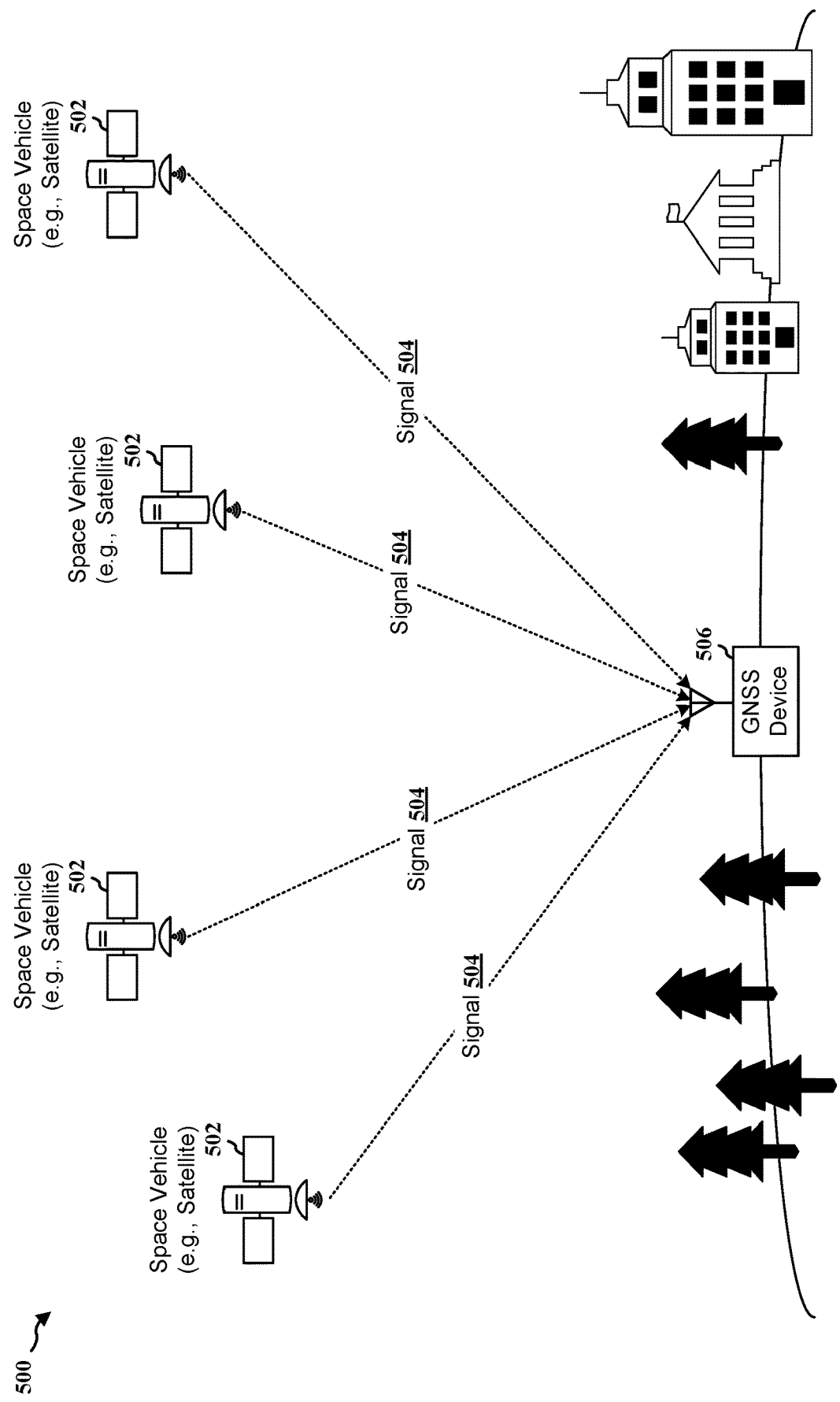
FIG. 5 is a diagram illustrating an example of global navigation satellite system (GNSS) positioning in accordance with various aspects of the present disclosure.

FIG. 5 is a diagram 500 illustrating an example of GNSS positioning in accordance with various aspects of the present disclosure. A GNSS device 506 may calculate its position and time based at least in part on data (e.g., GNSS signals 504) received from multiple space vehicles (SVs) 502, where each SV 502 may carry a record of its position and time and may transmit that data (e.g., the record) to the GNSS device 506. Each SV 502 may further include a clock that is synchronized with other clocks of SVs and with ground clock(s). If an SV 502 detects that there is a drift from the time maintained on the ground, the SV 502 may correct it. The GNSS device 506 may also include a clock, but the clock for the GNSS device 506 may be less stable and precise compared to the clocks for each SV 502.

As the speed of radio waves may be constant and independent of the satellite speed, a time delay between a time the SV 502 transmits a GNSS signal 504 and a time the GNSS device 506 receives the GNSS signal 504 may be proportional to the distance from the SV 502 to the GNSS device 506. In some examples, a minimum of four SVs may be used by the GNSS device 506 to compute/calculate one or more unknown quantities associated with positioning (e.g., three position coordinates and clock deviation from satellite time, etc.).

Each SV 502 may broadcast the GNSS signal 504 (e.g., a carrier wave with modulation) continuously that may include a pseudorandom code (e.g., a sequence of ones and zeros) which may be known to the GNSS device 506, and may also include a message that includes a time of transmission and the SV position at that time. In other words, each GNSS signal 504 may carry two types of information: time and carrier wave (e.g., a modulated waveform with an input signal to be electromagnetically transmitted). Based on the GNSS signals 504 received from each SV 502, the GNSS device 506 may measure the time of arrivals (TOAs) of the GNSS signals 504 and calculate the time of flights (TOFs) for the GNSS signals 504. Then, based on the TOFs, the GNSS device 506 may compute its three-dimensional position and clock deviation, and the GNSS device 506 may determine its position on the Earth. For example, the GNSS device 506's location may be converted to a latitude, a longitude, and a height relative to an ellipsoidal Earth model. These coordinates may be displayed, such as on a moving map display, or recorded or used by some other system, such as a vehicle guidance system.

While the distance between a GNSS device and an SV may be calculated based on the time it takes for a GNSS signal to reach the GNSS device, the SV's signal sequence may be delayed in relation to the GNSS device's sequence. Thus, in some examples, a delay may be applied to the GNSS device's sequence, such that the two sequences are aligned. For example, to calculate the delay, a GNSS device may align a pseudorandom binary sequence contained in the SV's signal to an internally generated pseudorandom binary sequence. As the SV's GNSS signal takes time to reach the GNSS device, the SV's sequence may be delayed in relation to the GNSS device's sequence. By increasingly delaying the GNSS device's sequence, the two sequences may eventually be aligned. The accuracy of GNSS positioning may depend on various factors, such as SV geometry, GNSS signal blockage, atmospheric conditions, and/or GNSS receiver design features/quality, etc. For example, GNSS receivers used by smartphones or smart watches may have an accuracy lower than GNSS receivers used by vehicles and surveying equipment.

The accuracy of GNSS based positioning may depend on various factors, such as satellite geometry, signal blockage, atmospheric conditions, and/or receiver design features/quality, etc. For example, GNSS receivers used by smartphones or smart watches may have lower accuracy compared to GNSS receivers used by vehicles and surveying equipments. To improve the accuracy of GNSS positioning (e.g., from meters to centimeters), a real time kinematics (RTK) technique or mechanism (which may collectively be referred to as an RTK engine hereafter) may be used for a positioning device (e.g., a UE, a surveying equipment, an automobile GNSS system, etc.). For example, an RTK engine may enable a positioning device to use correction information from a base station to mitigate one or more error sources in GNSS receiver PR and CP measurements, which may include satellite orbit error, satellite clock error, and/or atmospheric error, etc. Thus, better accuracy may be achieved by the positioning device.

Figure 6:
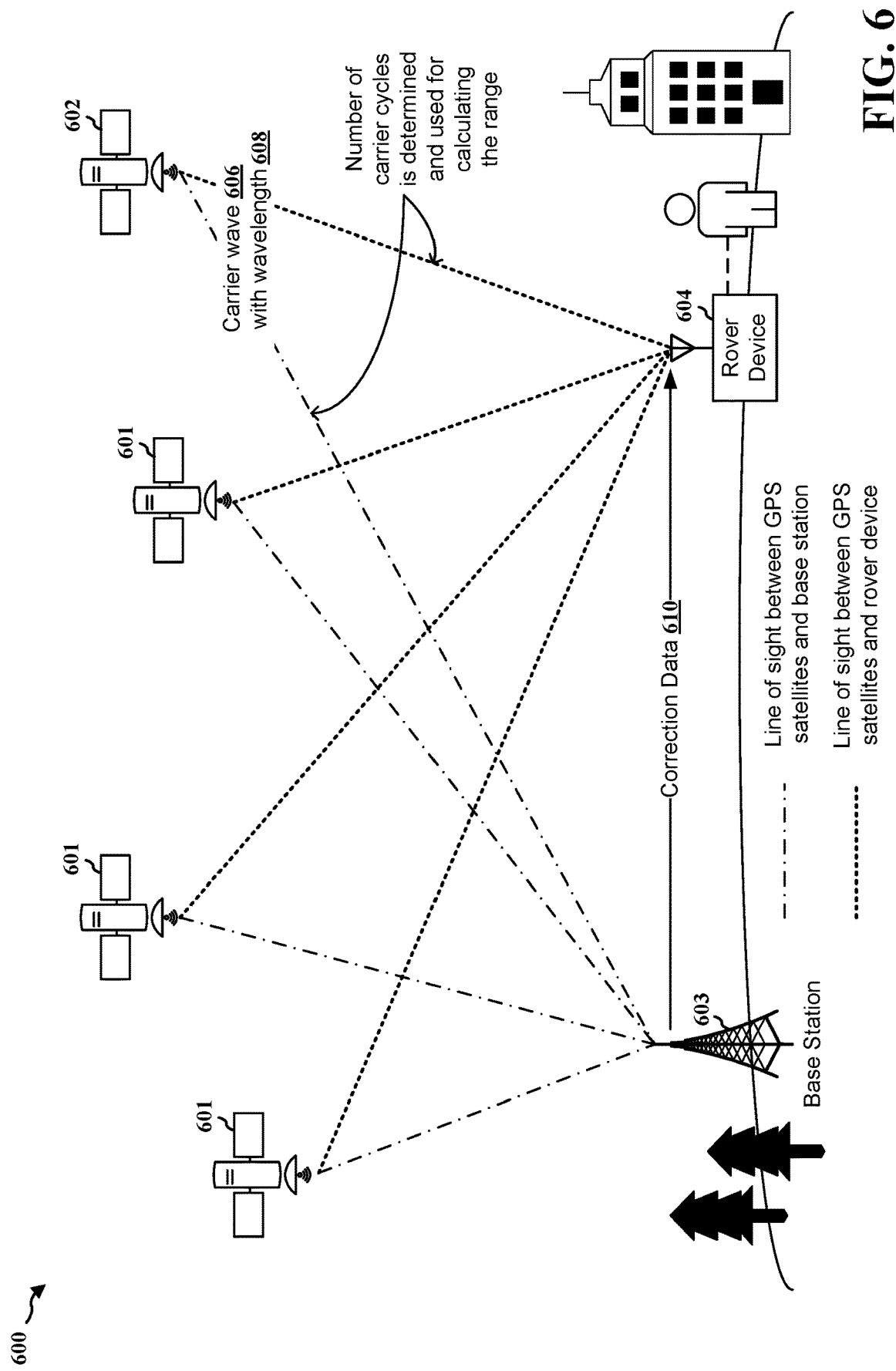
FIG. 6 is a diagram illustrating an example of a real time kinematics (RTK) positioning in accordance with various aspects of the present disclosure.

FIG. 6 is a diagram 600 illustrating an example of an RTK positioning in accordance with various aspects of the present disclosure. In one example, at least two receivers may be used in association with the RTK positioning, where at least one of the receivers may be stationary, which may be referred to as a base station 603 or an RTK base station, and at least one other receiver may be mobile (e.g., may be moving from time to time), which may be referred to as a rover or a rover device 604 (e.g., a GNSS/GPS receiver, a UE, a rover station, etc.). In other words, an RTK system may include a base station and a rover, where the base station may be a stationary receiver whose location is known.

A range between an SV 602 (e.g., a GNSS/GPS satellite) and the rover device 604 or between the SV 602 and the base station 603 may be calculated by determining a number of carrier cycles between the SV 602 and the rover device 604 or the base station 603, and multiplying this number by the carrier wavelength 608 of a carrier wave 606 (e.g., a carrier signal) transmitted by the SV 602. For example, if the SV 602 is transmitting a carrier wave 606 with a wavelength 608 of ten (10) meters, and the rover device 604 receives the carrier wave 606 and determines that there are five hundred (500) carrier cycles between the SV 602 and the rover device 604, then the rover device 604 may calculate the distance between the SV 602 and the rover device 604 by multiplying the number of carriers cycles determined (e.g., 600) with the carrier wavelength 608 (e.g., 10 meters), which may be five thousand meters (e.g., 600×10=6000). Similarly, the base station 603 may also receive the carrier wave 606 from the SV 602 and determine its ranges from the SV 602 based on the wavelength 608 of the carrier wave 606 and the number of carrier cycles between the base station 603 and the SV 602. The rover device 604 and/or the base station 603 may calculate ranges (e.g., distances) between the rover device 604/base station 603 and multiple (e.g., four or more) SVs (e.g., SVs 601 and 602) to determine their geographical locations (e.g., their locations on the Earth).

During the RTK positioning, the rover device 604 (e.g., a UE, a client device, etc.) may undergo an "ambiguity resolution" process to determine the number of carrier cycles between an SV 602 and the rover device 604. In other words, when the rover device 604 receives a carrier wave from an SV 602, it may take time for the rover device 604 to figure out how many carrier cycles are between the SV 602 and the rover device 604. In some examples, a GNSS receiver with more sophisticated or high-end antenna/hardware, such as an automotive grade antenna, may be able to resolve the ambiguity within a relatively short time (e.g., within seconds), while a GNSS receiver with less sophisticated or low-end antenna/hardware, such as antenna for mobile phone, and/or a smart watch, may take a longer time (e.g., 10-30 minutes or more) to resolve the ambiguity. In some examples, the ambiguity may also be referred to as an "integer ambiguity."

In some examples, ranges calculated by the rover device 604 may include errors due to SV clock and ephemerides, and ionospheric and tropospheric delays, etc. Also, as the rover device 604 is more likely to be moving, the quality of a signal/carrier wave received from each SV may change as the rover device moves from one location to another location. For example, if the rover device 604 moves from an open sky area to an area with buildings, signals from one or more SVs 601/602 may be blocked/reflected by the buildings. As such, ranges calculated by the rover device 604 may start to drift and may include error(s).

On the other hand, as the base station 603 is likely to be stationary with a known location, and the base station 603 may be equipped with a more sophisticated and high-end GNSS receiver, the base station 603 may be able to maintain an accurate calculation for the ranges compared to the rover device 604. For example, the base station 603 may be configured to locate at a site (e.g., an open sky area) that has minimal environmental effects such as interference and multipath. As such, under the RTK positioning, the base station 603 may be configured to calculate its location by using the signal received from SVs (e.g., the SVs 601/602) based on the carrier phase measurement, then the base station 603 may compare the calculated location to its known location to identify if there are any errors. If the base station 603 identifies that there are errors, the base station 603 may generate a correction data 610 (or a correction signal) and transmit the correction data 610 to the rover device 604 to assist the rover device 604 in correcting the errors. For example, as the rover device 604 may typically be configured to locate in proximity to the base station 603 (e.g., within 6 miles, 12 miles, etc.), the rover device 604 is likely to encounter similar errors (e.g., similar ionospheric and tropospheric delays) as the base station 603. Thus, the rover device 604 may use the correction data 610 from the base station 603 to improve its own computed position from the GNSS constellations to achieve centimeter precision. In other words, a base station may be configured to stay in a fixed/known location and send correction data to one or more rover devices, and the one or more rover devices may use the correction data to increase the precision of their positioning and also the speed of error correction. As such, the rover device 604 may determine its position using algorithms that incorporate ambiguity resolution and differential correction. The position accuracy achievable by the rover device 604 may depend on its distance from the base station 603 and the accuracy of the differential corrections (e.g., the correction data 610).

In some examples, a software or an application that accepts positioning related measurements from GNSS chipsets and/or sensors to estimate position, velocity, and/or altitude of a device may be referred to as a positioning engine. In addition, a positioning engine that is capable of achieving certain high level of accuracy (e.g., centimeter/decimeter level accuracy) and/or latency may be referred to as a precise positioning engine (PPE). For example, a positioning engine that is capable of performing RTK (e.g., receiving or processing correction data associated with RTK) may be considered as a PPE. In one aspect of the present disclosure, to further improve the accuracy and latency of positioning, an RTK engine may be used in association with one or more inertial measurement units (IMUs). An IMU may refer to a device that is capable of measuring and reporting specific gravity and/or angular rate of an object to which it is attached. An IMU may include a gyroscope (e.g., for measuring angular rate), an accelerometer (e.g., for measuring force/acceleration), and/or a magnetometer (e.g., for measuring magnetic field), etc.

Figure 7:
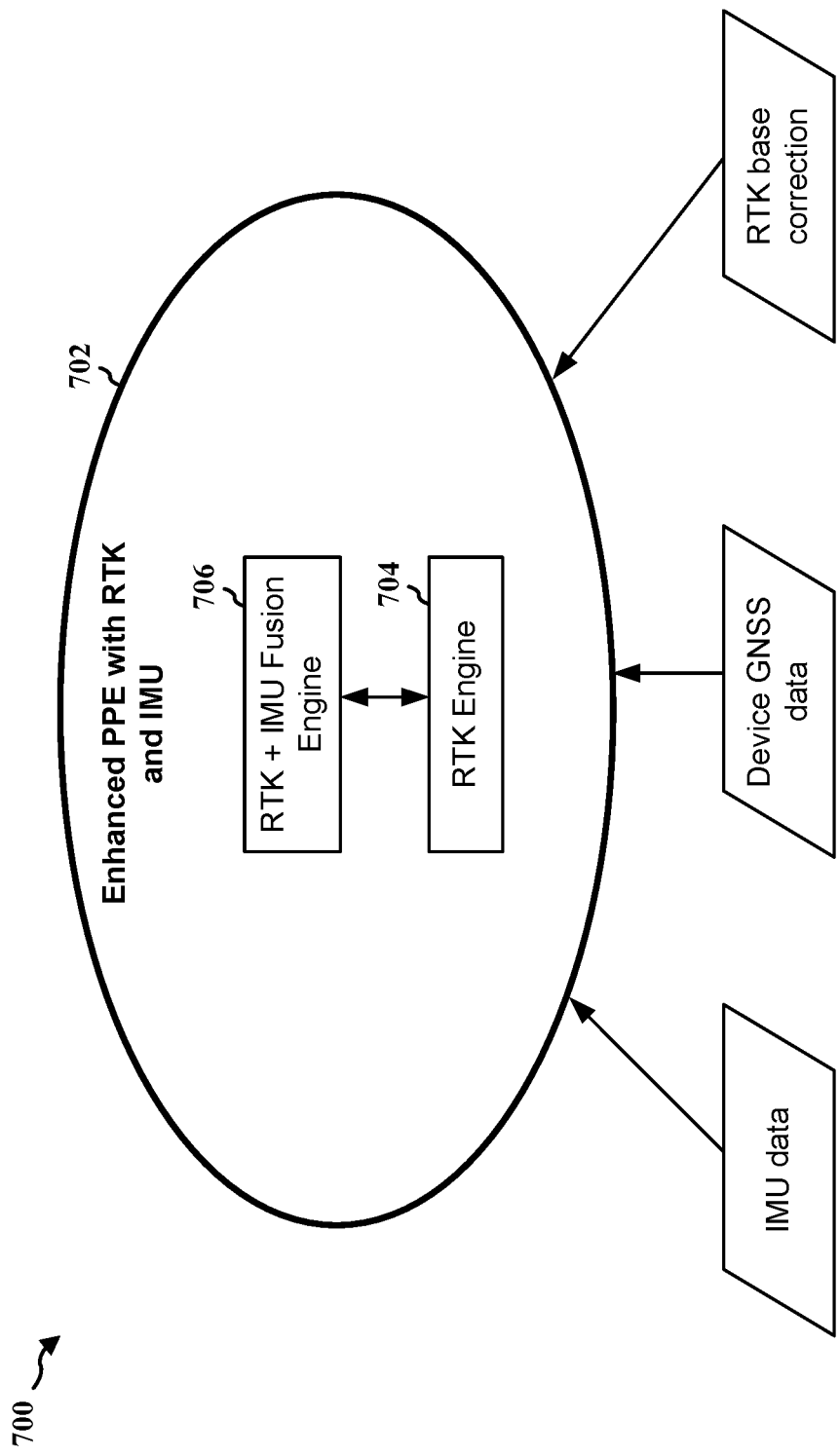
FIG. 7 is a diagram illustrating an example of a positioning engine that includes a fusion engine that fuses correction data from RTK with inertial measurement unit (IMU) data in accordance with various aspects of the present disclosure.

FIG. 7 is a diagram 700 illustrating an example of a positioning engine that includes a fusion engine that fuses correction data from an RTK base station with IMU data (e.g., measurements from IMUs) in accordance with various aspects of the present disclosure. In one example, a positioning engine 702 (which may be referred to as an enhanced PPE) may be associated with an RTK engine 704 and a fusion engine 706 (which may be referred to as an RTK+ IMU fusion engine). As described in connection with FIG. 6, the RTK engine 704 may take correction data from an RTK base station and GNSS data to achieve centimeter (cm) level accuracy. The fusion engine 706 may take RTK seed position to achieve cm level or decimeter (dm) level relative position accuracy with IMU data. One benefit of adding IMU to a PPE is that a higher rate of PPE solution may be achieved (e.g., 100/200 Hz of fusion position/velocity (PV) compared to 10 Hz RTK PV), which may increase the PPE availability when a positioning device is experiencing a short GNSS signal outage (e.g., unable to receive GNSS/positioning signals).

In one example, an RTK engine may be used in association with IMU(s) based on a tightly coupled implementation for Kalman filter (KF) states or a loosely coupled implementation for KF states. The KF may refer to a recursive estimator that uses an estimated state from a previous time step and a current measurement to compute the estimate for the current state. As shown by the Table 2 below, under the tightly coupled implementation (e.g., for KF states), the fusion engine states may include big KF state for both RTK and IMU, and the input may include both GNSS measurements and IMU data. While such implementation may provide a potentially better performance, it also has a higher design complexity, and more memory and million instructions per second (MIPS) consumption. On the other hand, under the loosely coupled implementation, the fusion engine states may have much smaller KF state and position/velocity/altitude/IMU states, and the input may include RTK positive/velocity injection and IMU data. Such implementation may specify less design complexity, and less memory and MIPS consumption, mostly could achieve comparable performance as the tightly coupled implementation.

TABLE 2

Example KF states for the tightly coupled implementation and the loosely coupled implementation

| Loosely coupled KF state | Tightly coupled KF state |
| --- | --- |
| Position | Position |
| Velocity | Velocity |
| Attitude | Attitude |
| Acceleration (acc) bias | Acc bias |
| Gyro drift | gyro drift |
| Acc/gyro scale factor | Acc/gyro scale factor |
| Acc/gyro non-orthogonality | Acc/gyro non-orthogonality |
| Lever arm inaccuracy | Lever arm inaccuracy |
| Sensor/body misalignment | Sensor/body misalignment |
| | Receiver clock |
| | Receiver clock rate |
| | Inter-satellite-type bias (ISTB) (which may also be referred to as inter/intra system/signal time bias) |
| | Ambiguities |
| | Trop |

Figure 8:
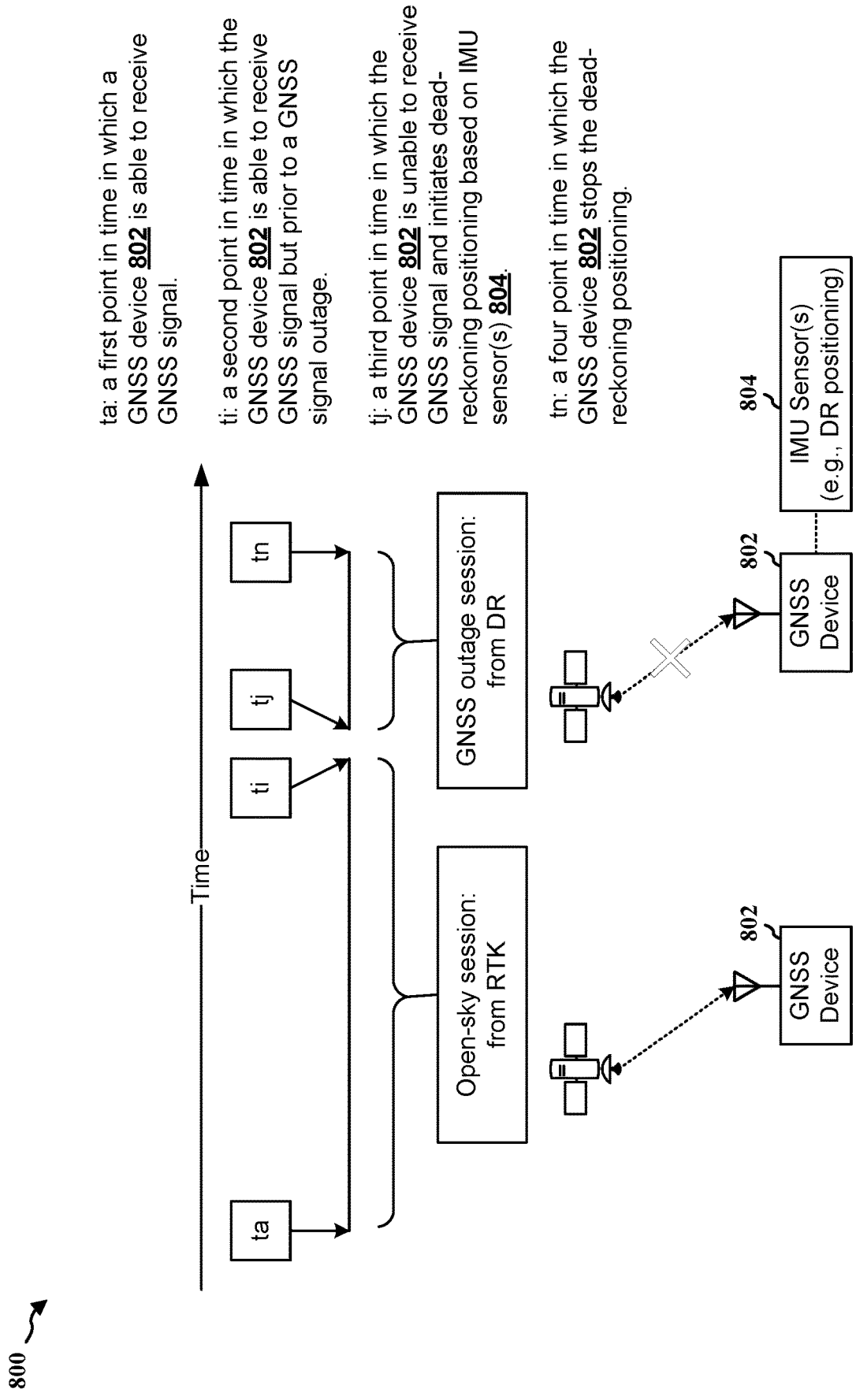
FIG. 8 is a diagram illustrating an example timeline of a GNSS device experiencing GNSS outage in accordance with various aspects of the present disclosure.

FIG. 8 is a diagram 800 illustrating an example timeline of a GNSS device experiencing a GNSS signal outage in accordance with various aspects of the present disclosure. In some scenarios, a GNSS device 802 may not be able to receive GNSS signals or the received GNSS signals may be below a signal threshold (which may be refer to as a GNSS signal outage), such as when the GNSS device 802 enters an indoor structure (e.g., a garage) or is in an urban area with tall buildings. In some examples, while the GNSS device 802 is experiencing the GNSS signal outage during a positioning session (e.g., the GNSS device 802 is performing navigation for a vehicle), the positioning engine (e.g., the PPE) of the GNSS device 802 may switch to dead-reckoning (DR) positioning using one or more IMU sensors 804, such that the positioning session may continue without interruption. DR or DR positioning may refer to a process of calculating the current position of a moving object (e.g., the GNSS device 802) by using a previously determined position, or fix, and then incorporating estimates of speed, heading direction, and course over elapsed time. For example, DR may calculate the moving object's position (e.g., relative position) by estimating the direction and distance traveled rather than relying on GNSS positioning.

As shown by the diagram 800, in one example, the GNSS device 802 may perform RTK-based positioning during an open sky session (e.g., the GNSS device 802 is able to receive GNSS signals above a signal threshold) from a first point in time (ta) to a second point time (ti). Then, when the GNSS device 802 experiences a GNSS signal outage from a third point in time (tj) to a fourth point time (tn), the GNSS device 802 may switch to the DR-based positioning such that the navigation process (e.g., the positioning session) is not interrupted by the GNSS signal outage. For example, a GNSS device on a vehicle may continue to provide navigation for a user after the vehicle enters into a tunnel by estimating the location of the vehicle in the tunnel based on the vehicle's speed and direction (measured via the IMU sensor(s)).

In some scenarios, the performance of DR-based positioning (which may be referred to as DR performance hereafter) using the one or more IMU sensors 804 during the GNSS signal outage may be affected by the position, velocity, and/or injection information provided by the RTK engine while the GNSS device is in the open sky session. For example, DR performance based on the one or more IMU sensors 804 during the GNSS signal outage (e.g., the time (tj) to the time (tn)) may be affected by RTK provided position/velocity information in the open sky session (e.g., the time (ta) to the time (ti)). In addition, DR performance may be determined by the accuracy of DR related KF states, which may include: platform orientation (e.g., heading, roll, pitch, etc.), acceleration bias, gyroscope drift (or gyro drift), acceleration/gyroscope scale factor, acceleration/gyroscope non-orthogonality, lever arm inaccuracy, and/or sensor/body misalignment, etc. For example, while the GNSS device 802 is in an open sky session, the fusion engine (e.g., the fusion engine 706) of the GNSS device 802 may receive the RTK position/velocity injection information, and the fusion engine may estimate the DR related KF states based on this information. As it may normally take some time to allow DR related KF states to be stabilized in the fusion engine, namely the sensor initialization time, the DR performance may be affected by the time in which the RTK can begin output the position/velocity for injection purpose and/or the KF states stabilization time after the position/velocity injection. For purposes of the present disclosure, the term "inject/injecting/injection" may refer to an action where one entity is providing information to another entity. For example, injection information from an RTK engine (or RTK engine injects positioning information) may refer to position and velocity calculated by the RTK engine that are to be transmitted to another entity (e.g., a fusion engine).

In some examples, it may not always appropriate to inject the position information from an RTK engine to a fusion engine right away (e.g., after the GNSS device starts or after the GNSS device just receives the GNSS signals), such as for RTK float solution on a mobile platform. For example, as described in connection with FIG. 6, as an RTK engine may specify some convergence time to allow the RTK engine to begin output high accuracy relative positioning, injecting the position information from an RTK engine to a fusion engine right away may affect the DR performance and/or the overall positioning performance.

Figure 9:
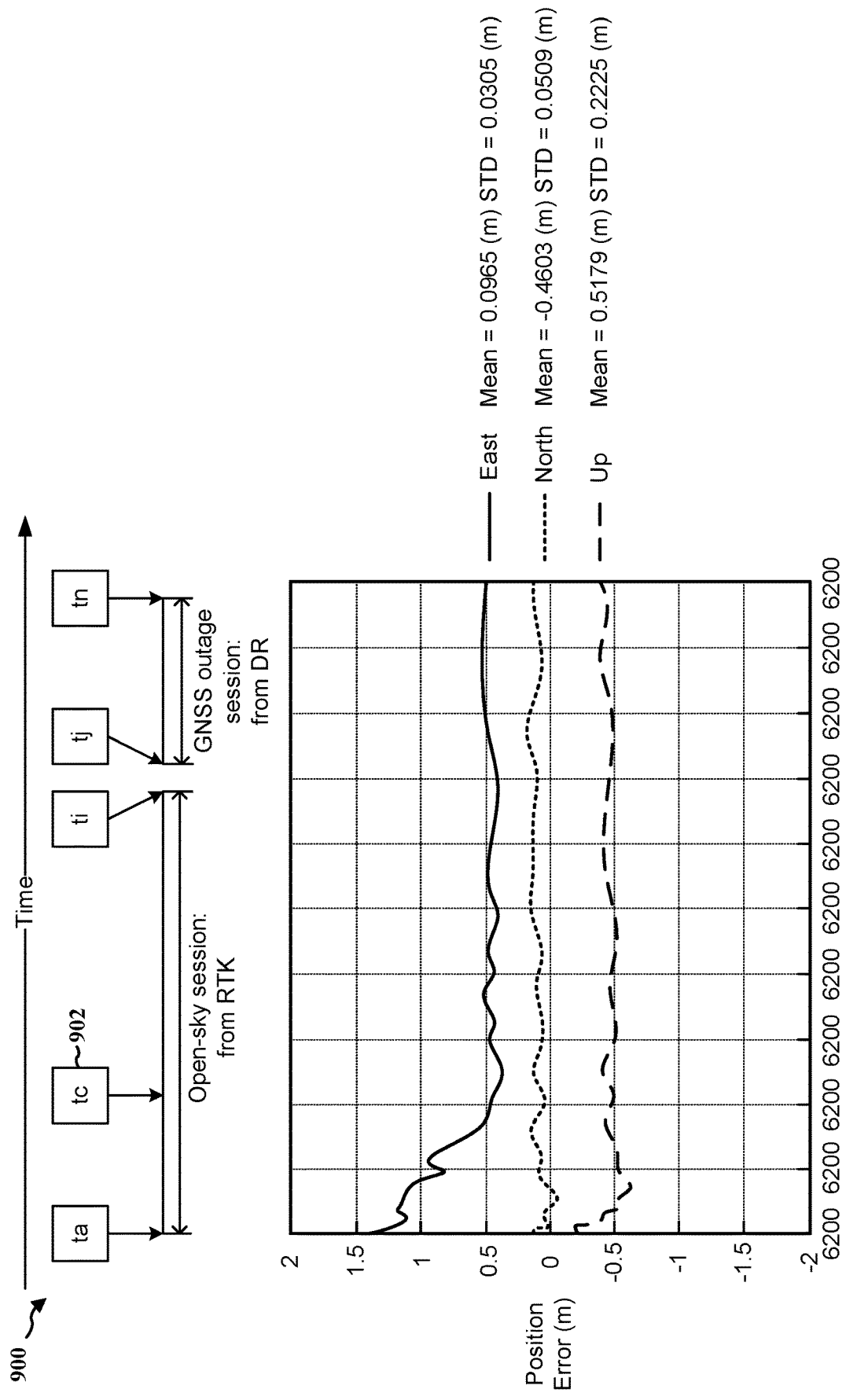
FIG. 9 is a diagram illustrating an example of an appropriate/suitable position information injection start time from an RTK engine in accordance with various aspects of the present disclosure.

FIG. 9 is a diagram 900 illustrating an example of an appropriate/suitable position information injection start time from an RTK engine in accordance with various aspects of the present disclosure. If the convergence time for an RTK engine is calculated based on the time (ta) to the time (tc) (e.g., tc−ta), as shown at 902, an appropriate/suitable position injection from the RTK engine may start from the time (tc). For example, if the convergence time for an RTK engine is about thirty (30) seconds, the sensor initialization time (e.g., the time to initiate IMU sensors) may be thirty seconds plus DR related KF states stabilization time after the position/velocity information injection from the RTK engine starts. In a real-time scenario, it may not be easy to determine when such injection can begin, as the injection time may depend on the horizontal estimated position error (HEPE), and sometimes the HEPE may not reflect horizontal error (HE) correctly. For purposes of the present disclosure, HEPE may refer to how much horizontal accuracy a user or device may expect for a current device position output, and HE may refer to an error that is based on comparing a device position with a more accurate ground truth, which may not be available in real-time.

Aspects presented herein may improve the latency and accuracy of UE positioning during a GNSS signal outage by reducing the sensor initialization time for one or more sensors that are to be used during the GNSS signal outage. Aspects presented herein may enable a fusion engine associated with a positioning engine (e.g., a PPE or an enhanced PPE) to receive positioning output from a second engine instead of the RTK engine, where the second engine may be configured to use delta carrier phase in the open sky session. In some examples, for purposes of differentiating the RTK engine from the second engine, the second engine may be referred to as a relative positioning engine. For example, the position output from the relative positioning engine may be used for DR position injection right away at the time (ta), such that the fusion engine or the IMU sensors does not wait for the RTK engine to converge (e.g., does not wait until the time (tc) for IMU sensor initialization). The relative position accuracy from this relative positioning engine may also be better than the RTK engine after convergence, therefore could also improve the estimation accuracy of the DR related KF states.

Figure 10:
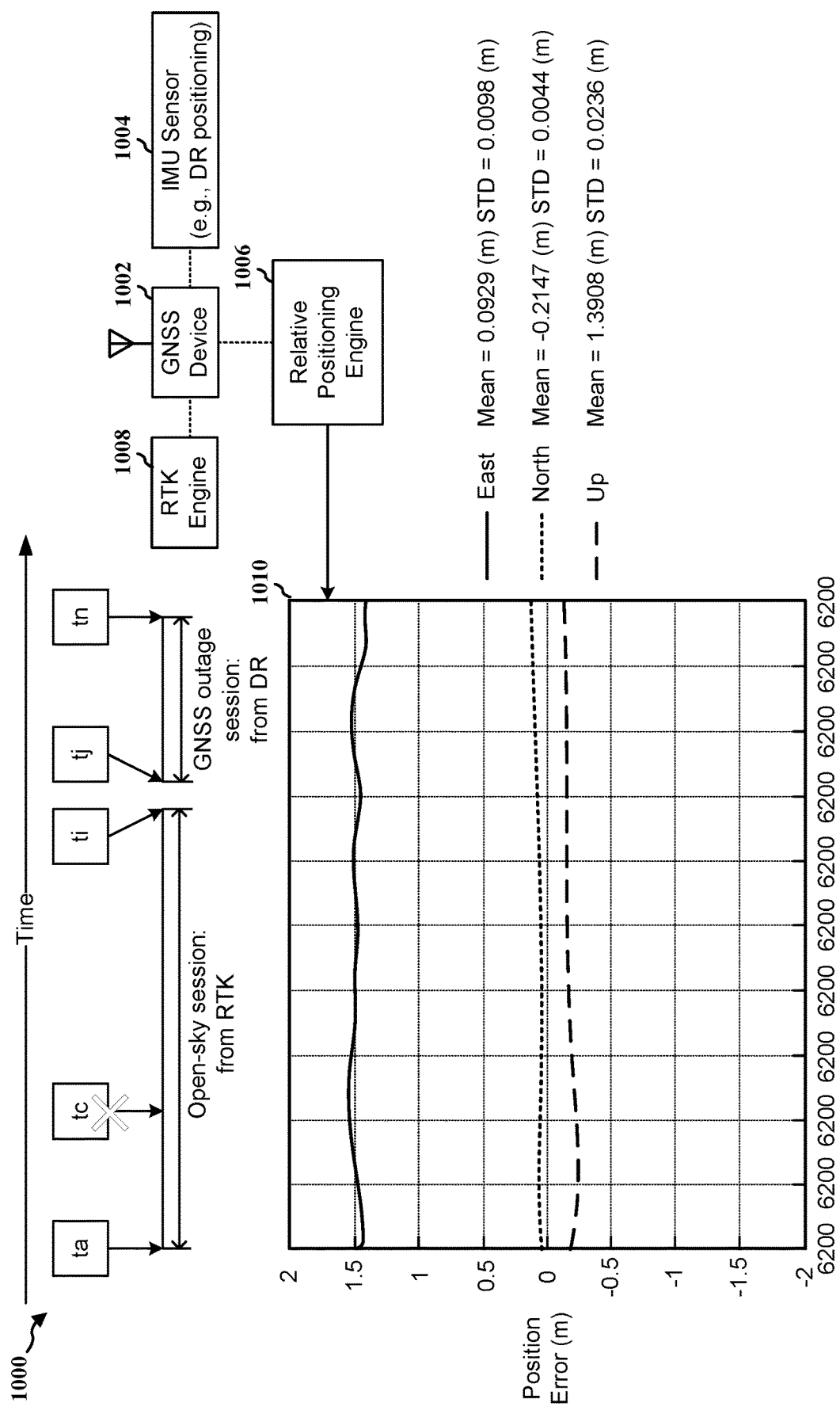
FIG. 10 is a diagram illustrating an example relative positioning engine that may be used for positioning information injection for a fusion engine in accordance with various aspects of the present disclosure.

FIG. 10 is a diagram 1000 illustrating an example relative positioning engine that may be used for positioning information injection for a fusion engine and/or for calibrating IMU sensor(s) in accordance with various aspects of the present disclosure. In one example, a GNSS device 1002, or a positioning engine implemented at the GNSS device 1002, may be associated with (e.g., receiving measurements from) at least one IMU sensor 1004, a relative positioning engine 1006 (e.g., a first engine), and an RTK engine 1008 (e.g., a second engine). In one aspect, the relative positioning engine 1006 may be configured to just measure and use delta carrier phase (CP) during the open-sky session (e.g., from the time (ta) to the time (ti)). As such, the relative positioning engine may not involve ambiguity processing, because ambiguity term(s) can be canceled out during the delta carrier phase measurement. As such, a high accuracy relative position may be available (for the GNSS device or a fusion engine associated with the GNSS device) right away at the time (ta) (e.g., a time the GNSS device 1002 starts or begins to receive GNSS signals, etc.), such as for DR position injection (or IMU sensor calibration) purpose(s). The DR position injection may refer to an injection function that is used or exists when a high-quality PPE PV solution is available. This injection may occur while in an open sky environment (e.g., ta to ti in FIG. 10). While in an GNSS outage, the high-quality PPE PV is not available, therefore no information may be injected to DR. So, the whole system/device may fully rely on IMU DR to output.

As the relative position accuracy from the relative positioning engine 1006 may be better than the RTK engine 1008 after convergence, the relative positioning engine 1006 may also improve the estimation accuracy of the DR related KF states. Aspects presented herein may apply to both tightly coupled implementation and loosely coupled implementation KF states as described in connection with Table 2. As such, a fusion engine used by the GNSS device 1002 may just use the delta carrier phase for the measurement update. For purposes of the present disclosure, the term "relative positioning" may refer to the positioning of a positioning device (e.g., the GNSS device 1002) at one point in time with respect to the positioning of the positioning device at another point in time. For example, relative positioning may provide a high accuracy solution to the delta position of a positioning device from a first point in time (T0) to a second point in time (T1) (even though their absolute position accuracy at T0/T1 may not be accurate (or above an accuracy threshold). As an example, an absolute position for a positioning device at T0 may have a 10 meter bias and the absolute position for the positioning device at T1 may have a 10.1 meter bias. The absolute position accuracy for the positioning device at both T0 and T1 may have an approximately −10 meter bias. On the other hand, for delta position accuracy from T0 to T1 (such as to measure the traveled distance), the relative positioning accuracy may be 0.1 meter. Also, the term "delta carrier phase" or "delta CP" may refer to the value change of the carrier phase measurement for a satellite at two different reference times, points, and/or frequencies (e.g., between a first point in time (T0) and a second point in time (T1), between a first location and a second location, etc.).

For example, when the GNSS device 1002 starts to receive GNSS signals, such as after the GNSS device 1002 is being turned on or resume from a GNSS signal outage session (e.g., at the time (ta) during a positioning session), the GNSS device 1002 may be configured to run both the relative positioning engine 1006 and the RTK engine 1008. When the GNSS device 1002 is unable to receive the GNSS signals or the received GNSS signals are below a signal threshold (e.g., at the time (tj) during the positioning session), the GNSS device 1002 may initiate a DR-based positioning using the at least one IMU sensor 1004, where a fusion engine at the GNSS device 1002 may receive the relative positioning information from the relative positioning engine 1006 and IMU data from the at least one IMU sensor 1004 to continue to perform positioning during the positioning session, such as described in connection with FIG. 7. In other words, relative positioning information from the relative positioning engine 1006 may be used for calibrating the at least one IMU sensor 1004, such that the GNSS device 1002 may perform a positioning calculation via the at least one IMU sensor 1004 in response to the GNSS signal being unavailable for a period of time. For purposes of the present disclosure, the term "calibrate/calibrating/calibration" may refer to an action or a process of configuring an instrument or an experiment reading to provide a result for a sample within an acceptable range. Thus, a goal of calibration is to minimize measurement uncertainties by ensuring the accuracy of an equipment (e.g., the at least one IMU sensor 1004). Calibration may quantify and control errors or uncertainties within measurement processes to an acceptable level.

In another aspect of the present disclosure, the GNSS device 1002 may calculate a bias between the relative positioning measurement from the relative positioning engine 1006 and positioning measurement from the RTK engine 1008, and then the GNSS device 1002 may align the positioning calculation of the GNSS device 1002 with the RTK engine 1008 based on the calculated bias.

Figure 11:
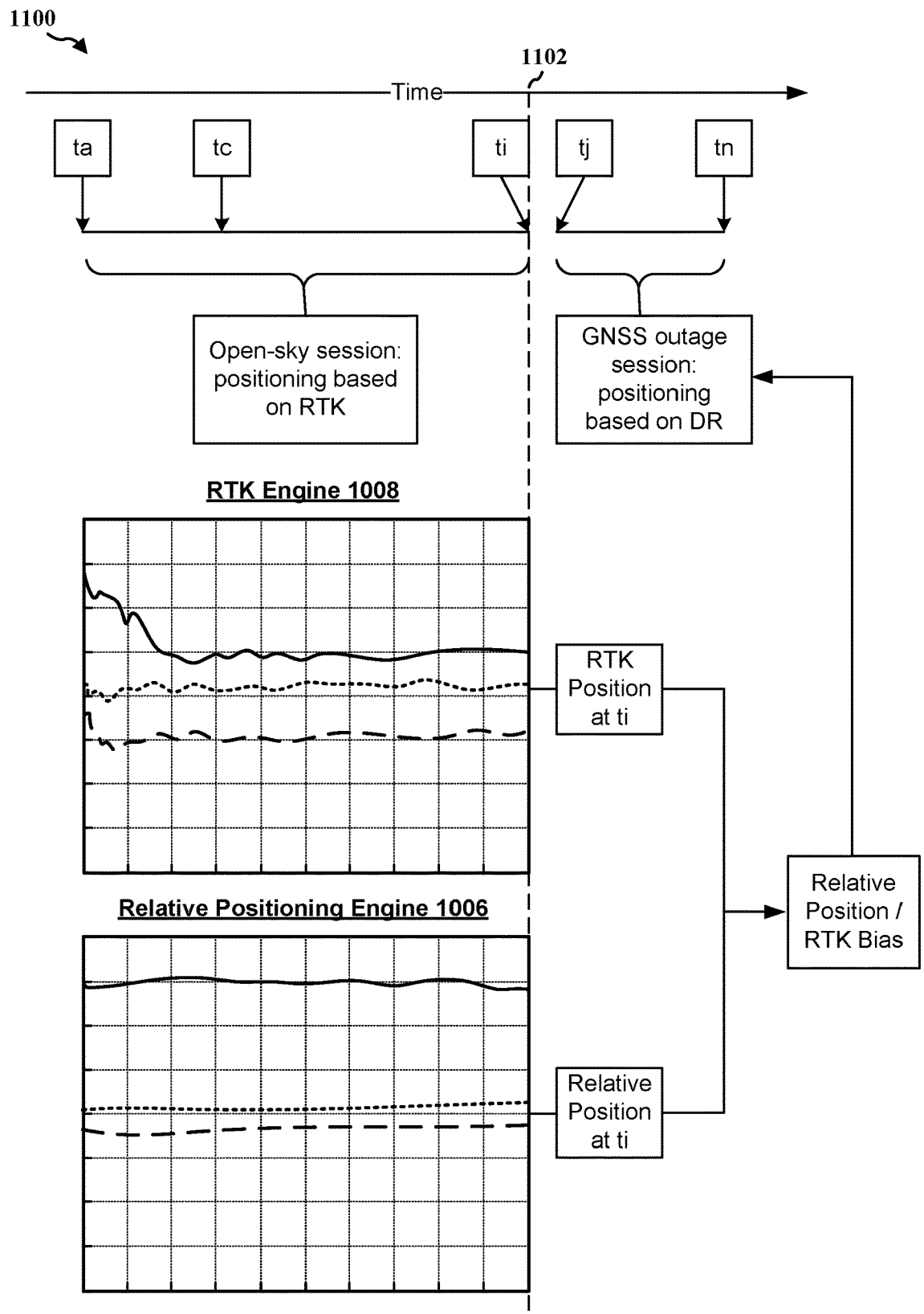
FIG. 11 is a diagram illustrating an example of a relative positioning (RP) engine and RTK engine bias compensation logic for dead-reckoning (DR) positioning output in accordance with various aspects of the present disclosure.

FIG. 11 is a diagram 1100 illustrating an example of a relative positioning engine and RTK engine bias (hereafter "RP/RTK bias") compensation logic for DR positioning output in accordance with various aspects of the present disclosure. As shown at 1102, at a last epoch of the open sky session at the time (ti), the position information injection may be from the relative positioning engine 1006. As DR positioning based on the at least one IMU 1004 is also associated with relative positioning, the DR positioning output during the GNSS signal outage session from the time (tj) to the time (tn) may be aligned to the relative positioning engine 1006. However, as it may normally be specified that the DR positioning is aligned to the RTK engine 1008, the RP/RTK bias may be computed at the time (ti). Then, the RP/RTK bias may be applied to the DR positioning output to ensure the DR positioning output is aligned with the RTK engine 1008.

Figure 12:
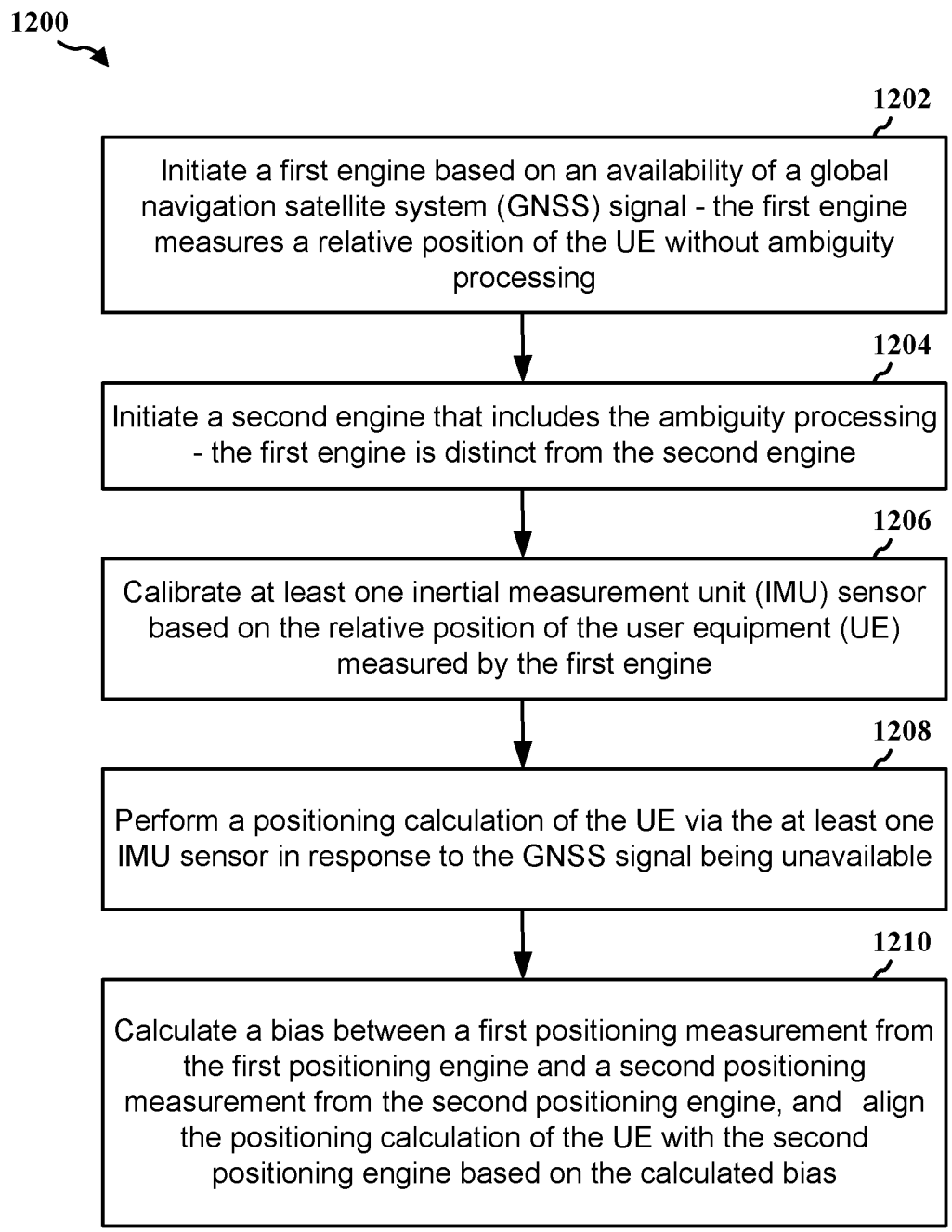
FIG. 12 is a flowchart of a method of wireless communication.

FIG. 12 is a flowchart 1200 of a method of wireless communication. The method may be performed by a UE (e.g., the UE 104, 404; the GNSS device 506, 802, 1002; the rover device 604; the apparatus 1404). The method may enable the UE to reduce sensor initialization time for one or more sensors that are to be used for DR positioning during a GNSS signal outage.

At 1202, the UE may initiate a first engine based on an availability of a GNSS signal, where the first engine measures a relative position of the UE without ambiguity processing, such as described in connection with FIGS. 7, 10, and 11. For example, as discussed in connection with FIG. 10, the GNSS device 1002 may initiate a relative positioning engine 1006 based on an availability of the GNSS signal, where the relative positioning engine 1006 measures a relative position of the GNSS device 1002 without ambiguity processing, such as shown at 1010. The initiation of the first engine may be performed by, e.g., the fusion engine component 198, the cellular baseband processor 1424, and/or the transceiver(s) 1422 of the apparatus 1404 in FIG. 14.

In one example, the first positioning engine measures a delta carrier phase when the GNSS signal is available.

In another example, the ambiguity processing corresponds to converging at least one estimated ambiguity term associated with RTK positioning to a stable value or an integer.

In another example, the availability of the GNSS signal is available when the first positioning engine is initiated, such that the first positioning engine is initiated based on the GNSS signal being available.

At 1204, the UE may initiate a second engine that includes the ambiguity processing, where the first engine is distinct from the second engine, such as described in connection with FIGS. 7, 10, and 11. For example, as discussed in connection with FIG. 10, the GNSS device 1002 may initiate an RTK engine 1008 at the time (ta) that includes the ambiguity processing. The initiation of the second engine may be performed by, e.g., the fusion engine component 198, the cellular baseband processor 1424, and/or the transceiver(s) 1422 of the apparatus 1404 in FIG. 14. In one an example, the UE may perform the positioning calculation of the UE via the second positioning engine based on the GNSS signal being available.

In another example, the first positioning engine corresponds to a relative positioning engine and the second positioning engine corresponds to an RTK engine.

At 1206, the UE may calibrate at least one IMU sensor based on the relative position of the UE measured by the first engine, such as described in connection with FIGS. 7, 10, and 11. For example, as discussed in connection with FIG. 10, the GNSS device 1002 may calibrate the at least one IMU sensor 1004 based on the relative position of the GNSS device 1002 measured by the relative positioning engine 1006. The calibration of the at least one IMU sensor may be performed by, e.g., the fusion engine component 198, the one or more sensor modules 1418, the cellular baseband processor 1424, and/or the transceiver(s) 1422 of the apparatus 1404 in FIG. 14.

In one example, the at least one IMU sensor includes at least one of: a gyroscope, an accelerometer, or a magnetometer.

At 1208, the UE may perform a positioning calculation of the UE via the at least one IMU sensor in response to the GNSS signal being unavailable, such as described in connection with FIGS. 7, 10, and 11. For example, as discussed in connection with FIG. 10, the GNSS device 1002 may perform DR positioning via the at least one IMU sensor when there is a GNSS signal outage. The positioning calculation may be performed by, e.g., the fusion engine component 198, the one or more sensor modules 1418, the cellular baseband processor 1424, and/or the transceiver(s) 1422 of the apparatus 1404 in FIG. 14.

In one example, the GNSS being available corresponds to an open-sky positioning session and the GNSS being unavailable corresponds to a GNSS outage session.

In another example, the positioning calculation of the UE is performed via the at least one IMU sensor based on DR.

At 1210, the UE may calculate a bias between a first positioning measurement from the first positioning engine and a second positioning measurement from the second positioning engine, and align the positioning calculation of the UE with the second positioning engine based on the calculated bias, such as described in connection with FIGS. 7, 10, and 11. For example, as discussed in connection with FIG. 11, the GNSS device 1002 may calculate a RP/RTK bias between relative positioning measurement from the relative positioning engine 1006 and positioning measurement from the RTK engine 1008, then the GNSS device 1002 may apply the RP/RTK to the DR positioning output to ensure the DR positioning output is aligned with the RTK engine 1008. The calculation of the bias and/or the alignment of the positioning calculation may be performed by, e.g., the fusion engine component 198, the one or more sensor modules 1418, the cellular baseband processor 1424, and/or the transceiver(s) 1422 of the apparatus 1404 in FIG. 14.

Figure 13:
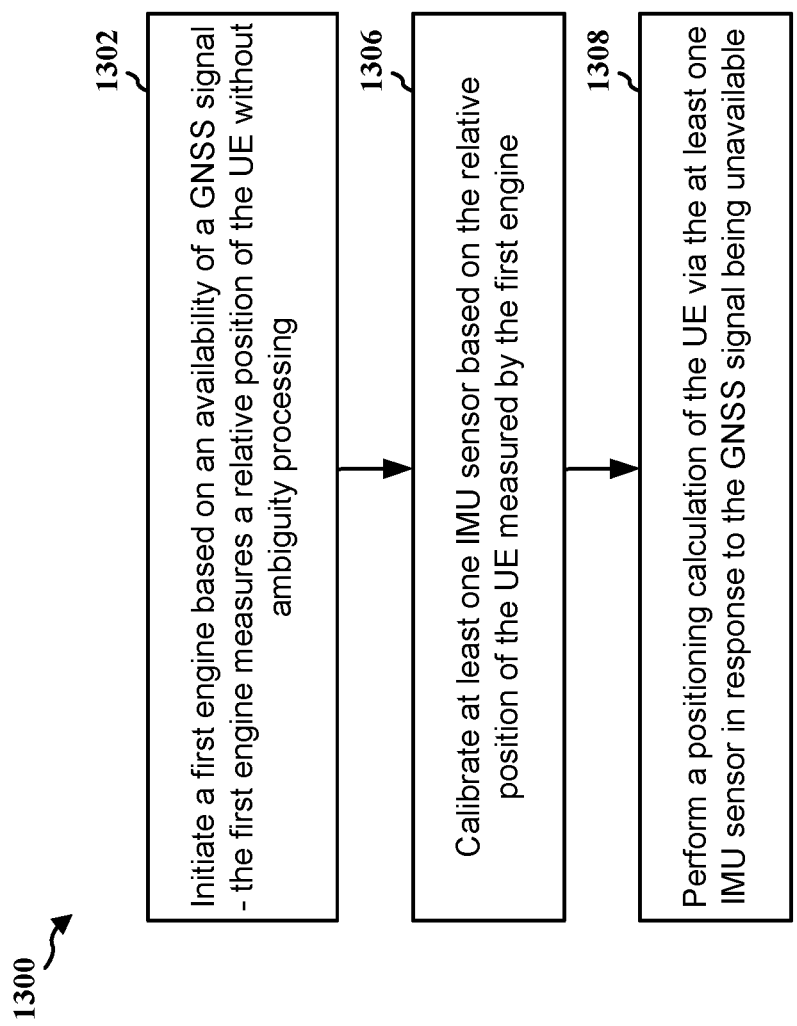
FIG. 13 is a flowchart of a method of wireless communication.

FIG. 13 is a flowchart 1300 of a method of wireless communication. The method may be performed by a UE (e.g., the UE 104, 404; the GNSS device 506, 802, 1002; the rover device 604; the apparatus 1404). The method may enable the UE to reduce sensor initialization time for one or more sensors that are to be used for DR positioning during a GNSS signal outage.

At 1302, the UE may initiate a first engine based on an availability of a GNSS signal, where the first engine measures a relative position of the UE without ambiguity processing, such as described in connection with FIGS. 7, 10, and 11. For example, as discussed in connection with FIG. 10, the GNSS device 1002 may initiate a relative positioning engine 1006 based on an availability of the GNSS signal, where the relative positioning engine 1006 measures a relative position of the GNSS device 1002 without ambiguity processing, such as shown at 1010. The initiation of the first engine may be performed by, e.g., the fusion engine component 198, the cellular baseband processor 1424, and/or the transceiver(s) 1422 of the apparatus 1404 in FIG. 14.

At 1306, the UE may calibrate at least one IMU sensor based on the relative position of the UE measured by the first engine, such as described in connection with FIGS. 7, 10, and 11. For example, as discussed in connection with FIG. 10, the GNSS device 1002 may calibrate the at least one IMU sensor 1004 based on the relative position of the GNSS device 1002 measured by the relative positioning engine 1006. The calibration of the at least one IMU sensor may be performed by, e.g., the fusion engine component 198, the one or more sensor modules 1418, the cellular baseband processor 1424, and/or the transceiver(s) 1422 of the apparatus 1404 in FIG. 14.

At 1308, the UE may perform a positioning calculation of the UE via the at least one IMU sensor in response to the GNSS signal being unavailable, such as described in connection with FIGS. 7, 10, and 11. For example, as discussed in connection with FIG. 10, the GNSS device 1002 may perform DR positioning via the at least one IMU sensor when there is a GNSS signal outage. The positioning calculation may be performed by, e.g., the fusion engine component 198, the one or more sensor modules 1418, the cellular baseband processor 1424, and/or the transceiver(s) 1422 of the apparatus 1404 in FIG. 14.

In one example, the first positioning engine measures a delta carrier phase when the GNSS signal is available.

In another example, the ambiguity processing corresponds to converging at least one estimated ambiguity term associated with RTK positioning to a stable value or an integer.

In another example, the availability of the GNSS signal is available when the first positioning engine is initiated, such that the first positioning engine is initiated based on the GNSS signal being available.

In another example, the UE may initiate a second engine that includes the ambiguity processing, where the first engine is distinct from the second engine, such as described in connection with FIGS. 7, 10, and 11. For example, as discussed in connection with FIG. 10, the GNSS device 1002 may initiate an RTK engine 1008 at the time (ta) that includes the ambiguity processing. The initiation of the second engine may be performed by, e.g., the fusion engine component 198, the cellular baseband processor 1424, and/or the transceiver(s) 1422 of the apparatus 1404 in FIG. 14. In such an example, the UE may perform the positioning calculation of the UE via the second positioning engine based on the GNSS signal being available.

In another example, the first positioning engine corresponds to a relative positioning engine and the second positioning engine corresponds to an RTK engine.

In another example, the at least one IMU sensor includes at least one of: a gyroscope, an accelerometer, or a magnetometer.

In another example, the GNSS being available corresponds to an open-sky positioning session and the GNSS being unavailable corresponds to a GNSS outage session.

In another example, the positioning calculation of the UE is performed via the at least one IMU sensor based on DR.

In another example, the UE may calculate a bias between a first positioning measurement from the first positioning engine and a second positioning measurement from the second positioning engine, and align the positioning calculation of the UE with the second positioning engine based on the calculated bias, such as described in connection with FIGS. 7, 10, and 11. For example, as discussed in connection with FIG. 11, the GNSS device 1002 may calculate a RP/RTK bias between relative positioning measurement from the relative positioning engine 1006 and positioning measurement from the RTK engine 1008, then the GNSS device 1002 may apply the RP/RTK to the DR positioning output to ensure the DR positioning output is aligned with the RTK engine 1008. The calculation of the bias and/or the alignment of the positioning calculation may be performed by, e.g., the fusion engine component 198, the cellular baseband processor 1424, and/or the transceiver(s) 1422 of the apparatus 1404 in FIG. 14.

Figure 14:
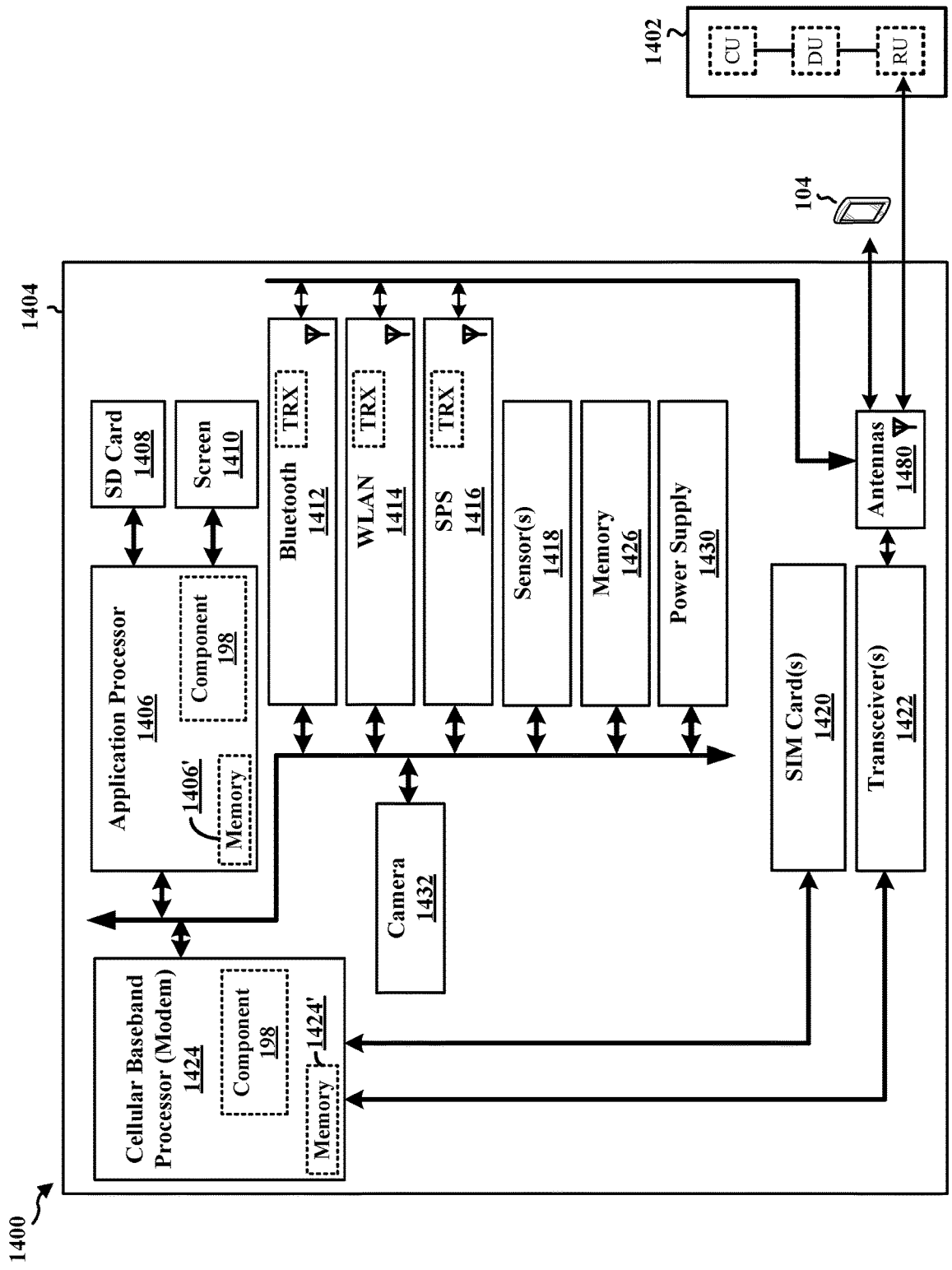
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the fusion engine component 198 is configured to initiate a first positioning engine based on an availability of a GNSS signal, where the first positioning engine measures a relative position of the UE without ambiguity processing. The fusion engine component 198 may also be configured to calibrate at least one IMU sensor based on the relative position of the UE measured by the first positioning engine. The fusion engine component 198 may also be configured to perform a positioning calculation of the UE via the at least one IMU sensor in response to the GNSS signal being unavailable. The fusion engine component 198 may be within the cellular baseband processor 1424, the application processor 1406, or both the cellular baseband processor 1424 and the application processor 1406. The fusion engine component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for initiating a first positioning engine based on an availability of a GNSS signal, where the first positioning engine measures a relative position of the UE without ambiguity processing. The apparatus 1404 may further include means for calibrating at least one IMU sensor based on the relative position of the UE measured by the first positioning engine. The apparatus 1404 may further include means for performing a positioning calculation of the UE via the at least one IMU sensor in response to the GNSS signal being unavailable.

In one configuration, the first positioning engine measures a delta carrier phase when the GNSS signal is available.

In another configuration, the ambiguity processing corresponds to converging at least one estimated ambiguity term associated with RTK positioning to a stable value or an integer.

In another configuration, the availability of the GNSS signal is available when the first positioning engine is initiated, such that the first positioning engine is initiated based on the GNSS signal being available.

In another configuration, the apparatus 1404 may further include means for initiating a second engine that includes the ambiguity processing, where the first engine is distinct from the second engine. In such a configuration, the apparatus 1404 may further include means for performing the positioning calculation of the UE via the second positioning engine based on the GNSS signal being available.

In another configuration, the first positioning engine corresponds to a relative positioning engine and the second positioning engine corresponds to an RTK engine.

In another configuration, the at least one IMU sensor includes at least one of: a gyroscope, an accelerometer, or a magnetometer.

In another configuration, the GNSS being available corresponds to an open-sky positioning session and the GNSS being unavailable corresponds to a GNSS outage session.

In another configuration, the positioning calculation of the UE is performed via the at least one IMU sensor based on DR.

In another configuration, the apparatus 1404 may further include means for calculating a bias between a first positioning measurement from the first positioning engine and a second positioning measurement from the second positioning engine, and means for aligning the positioning calculation of the UE with the second positioning engine based on the calculated bias.

The means may be the fusion engine component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first UE, including: initiating a first engine based on an availability of a GNSS signal, where the first engine measures a relative position of the UE without ambiguity processing; calibrating at least one IMU sensor based on the relative position of the UE measured by the first engine; and performing a positioning calculation of the UE via the at least one IMU sensor in response to the GNSS signal being unavailable.

Aspect 2 is the method of aspect 1, further including: initiating a second engine that includes the ambiguity processing, where the first engine is distinct from the second engine.

Aspect 3 is the method of aspect 2, further including performing the positioning calculation of the UE via the second engine based on the GNSS signal being available.

Aspect 4 is the method of aspect 2, where the first engine corresponds to a relative positioning engine and the second engine corresponds to an RTK engine.

Aspect 5 is the method of aspect 2, further including: calculating a bias between a first positioning measurement from the first engine and a second positioning measurement from the second engine; and aligning the positioning calculation of the UE with the second engine based on the calculated bias.

Aspect 6 is the method of any of aspects 1 to 5, where the first engine measures a delta carrier phase when the GNSS signal is available.

Aspect 7 is the method of any of aspects 1 to 6, where the at least one IMU sensor includes at least one of: a gyroscope, an accelerometer, or a magnetometer.

Aspect 8 is the method of any of aspects 1 to 7, where the ambiguity processing corresponds to converging at least one estimated ambiguity term associated with RTK positioning to a stable value or an integer.

Aspect 9 is the method of any of aspects 1 to 8, where the GNSS being available corresponds to an open-sky positioning session and the GNSS being unavailable corresponds to a GNSS outage session.

Aspect 10 is the method of any of aspects 1 to 9, where the availability of the GNSS signal is available when the first engine is initiated, such that the first engine is initiated based on the GNSS signal being available.

Aspect 11 is the method of any of aspects 1 to 10, where the positioning calculation of the UE is performed via the at least one IMU sensor based on DR.

Aspect 12 is the method of any of aspects 1 to 11, further including transmitting an indication of the positioning calculation of the UE.

Aspect 13 is an apparatus for wireless communication at a first UE, including: a memory; and at least one processor coupled to the memory and, based at least in part on information stored in the memory, the at least one processor is configured to implement any of aspects 1 to 12.

Aspect 14 is the apparatus of aspect 13, further including at least one of a transceiver or an antenna coupled to the at least one processor, where the indication of the positioning calculation of the UE is transmitted via at least one of the transceiver or the antenna.

Aspect 15 is an apparatus for wireless communication including means for implementing any of aspects 1 to 12.

Aspect 16 is a computer-readable medium (e.g., a non-transitory computer-readable medium) storing computer executable code, where the code when executed by a processor causes the processor to implement any of aspects 1 to 12.

What is claimed is:

1. An apparatus for wireless communication at a user equipment (UE), comprising:
at least one memory; and
at least one processor coupled to the at least one memory and, based at least in part on information stored in the at least one memory, the at least one processor is configured to:
initiate a first engine based on an availability of a global navigation satellite system (GNSS) signal, wherein the first engine measures a relative position of the UE without ambiguity processing;
initiate a second engine that includes the ambiguity processing, wherein the first engine is distinct from the second engine;
calibrate at least one inertial measurement unit (IMU) sensor based on the relative position of the UE measured by the first engine; and
perform a positioning calculation of the UE via the at least one IMU sensor in response to the GNSS signal being unavailable, and perform the positioning calculation of the UE via the second engine based on the GNSS signal being available.

2. The apparatus of claim 1, wherein the first engine corresponds to a relative positioning engine and the second engine corresponds to a real-time kinematic (RTK) engine.

3. The apparatus of claim 1, wherein the at least one processor is further configured to:
calculate a bias between a first positioning measurement from the first engine and a second positioning measurement from the second engine; and
align the positioning calculation of the UE with the second engine based on the calculated bias.

4. The apparatus of claim 1, wherein the first engine measures a delta carrier phase when the GNSS signal is available.

5. The apparatus of claim 1, wherein the at least one IMU sensor includes at least one of: a gyroscope, an accelerometer, or a magnetometer.

6. The apparatus of claim 1, wherein the ambiguity processing corresponds to converging at least one estimated ambiguity term associated with real-time kinematic (RTK) positioning to a stable value or an integer.

7. The apparatus of claim 1, wherein the GNSS being available corresponds to an open-sky positioning session and the GNSS being unavailable corresponds to a GNSS outage session.

8. The apparatus of claim 1, wherein the availability of the GNSS signal is available when the first engine is initiated, such that the first engine is initiated based on the GNSS signal being available.

9. The apparatus of claim 1, wherein the positioning calculation of the UE is performed via the at least one IMU sensor based on dead reckoning (DR).

10. The apparatus of claim 1, wherein the at least one processor is further configured to transmit an indication of the positioning calculation of the UE, further comprising a transceiver coupled to the at least one processor, wherein the indication of the positioning calculation of the UE is transmitted via the transceiver.

11. A method of wireless communication at a user equipment (UE), comprising:
initiating a first engine based on an availability of a global navigation satellite system (GNSS) signal, wherein the first engine measures a relative position of the UE without ambiguity processing;

initiating a second engine that includes the ambiguity processing, wherein the first engine is distinct from the second engine;

calibrating at least one inertial measurement unit (IMU) sensor based on the relative position of the UE measured by the first engine; and performing a positioning calculation of the UE via the at least one IMU sensor in response to the GNSS signal being unavailable, and performing the positioning calculation of the UE via the second engine based on the GNSS signal being available.

12. The method of claim 11, wherein the first engine corresponds to a relative positioning engine and the second engine corresponds to a real-time kinematic (RTK) engine.

13. The method of claim 11, further comprising:
calculating a bias between a first positioning measurement from the first engine and a second positioning measurement from the second engine; and
aligning the positioning calculation of the UE with the second engine based on the calculated bias.

14. The method of claim 11, wherein the first engine measures a delta carrier phase when the GNSS signal is available.

15. The method of claim 11, wherein the at least one IMU sensor includes at least one of: a gyroscope, an accelerometer, or a magnetometer.

16. The method of claim 11, wherein the ambiguity processing corresponds to converging at least one estimated ambiguity term associated with real-time kinematic (RTK) positioning to a stable value or an integer.

17. The method of claim 11, wherein the GNSS being available corresponds to an open-sky positioning session and the GNSS being unavailable corresponds to a GNSS outage session.

18. The method of claim 11, wherein the availability of the GNSS signal is available when the first engine is initiated, such that the first engine is initiated based on the GNSS signal being available.

19. The method of claim 11, wherein the positioning calculation of the UE is performed via the at least one IMU sensor based on dead reckoning (DR).

20. The method of claim 11, further comprising transmitting an indication of the positioning calculation of the UE.

21. An apparatus for wireless communication at a user equipment (UE), comprising:

means for initiating a first engine based on an availability of a global navigation satellite system (GNSS) signal, wherein the first engine measures a relative position of the UE without ambiguity processing;

means for initiating a second engine that includes the ambiguity processing, wherein the first engine is distinct from the second engine;

means for calibrating at least one inertial measurement unit (IMU) sensor based on the relative position of the UE measured by the first engine; and means for performing a positioning calculation of the UE via the at least one IMU sensor in response to the GNSS signal being unavailable, and means for perform the positioning calculation of the UE via the second engine based on the GNSS signal being available.

22. The apparatus of claim 21, further comprising:
means for calculating a bias between a first positioning measurement from the first engine and a second positioning measurement from the second engine; and
means for aligning the positioning calculation of the UE with the second engine based on the calculated bias.

23. The apparatus of claim 21, wherein the first engine corresponds to a relative positioning engine and the second engine corresponds to a real-time kinematic (RTK) engine.

24. A non-transitory computer-readable medium storing computer executable code at a user equipment (UE), the code when executed by a processor causes the processor to:
initiate a first engine based on an availability of a global navigation satellite system (GNSS) signal, wherein the first engine measures a relative position of the UE without ambiguity processing;
initiate a second engine that includes the ambiguity processing, wherein the first engine is distinct from the second engine;
calibrate at least one inertial measurement unit (IMU) sensor based on the relative position of the UE measured by the first engine; and
perform a positioning calculation of the UE via the at least one IMU sensor in response to the GNSS signal being unavailable, and perform the positioning calculation of the UE via the second engine based on the GNSS signal being available.

* * * * *